United States Patent
Bossler et al.

(10) Patent No.: US 8,311,035 B2
(45) Date of Patent: Nov. 13, 2012

(54) METHODS AND APPARATUS FOR COMMUNICATING INTERNET PROTOCOL BASED CONTROL SIGNALING THROUGH A COMMUNICATIONS SYSTEM

(75) Inventors: Dan Bossler, Chandler, AZ (US); Elizabeth Marie Raslavsky, Chandler, AZ (US); Nicole Marie Loomis, Fountain Hills, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 1077 days.

(21) Appl. No.: 12/241,474

(22) Filed: Sep. 30, 2008

(65) Prior Publication Data

US 2010/0080211 A1    Apr. 1, 2010

(51) Int. Cl.
*H04L 12/66* (2006.01)
(52) U.S. Cl. ....................................................... 370/352
(58) Field of Classification Search .................. None
See application file for complete search history.

(56) References Cited

U.S. PATENT DOCUMENTS

| | | | | |
|---|---|---|---|---|
| 7,467,208 | B1 * | 12/2008 | Hurtta et al. | 709/227 |
| 2003/0064728 | A1 * | 4/2003 | Speight | 455/450 |
| 2003/0157952 | A1 * | 8/2003 | Sarkkinen et al. | 455/522 |
| 2004/0013096 | A1 * | 1/2004 | Marinier et al. | 370/328 |
| 2004/0024791 | A1 * | 2/2004 | Martin et al. | 707/200 |
| 2004/0081192 | A1 * | 4/2004 | Koulakiotis et al. | 370/432 |
| 2005/0147040 | A1 * | 7/2005 | Vayanos et al. | 370/235 |

* cited by examiner

*Primary Examiner* — Yong Zhou
(74) *Attorney, Agent, or Firm* — Ingrassia Fisher & Lorenz, P.C.

(57) ABSTRACT

An embodiment of a method for communicating call control signaling information in a communications system that includes a user equipment (UE) and a base includes the UE formatting the call control signaling information, transmitting the call control signaling information over a first logical channel that is mapped to a first transport channel, and transmitting user traffic over a second logical channel that is mapped to a second transport channel. In an embodiment, the base receives the call control signaling information from the UE over the first logical channel, receives the user traffic from the UE over the second logical channel, and transmits the call control signaling information to a core network. In an embodiment, the communication system is an IP network in which information is exchanged between the UE and the base using a W-CDMA transmission protocol. The base may form a portion of a satellite-based radio network.

21 Claims, 5 Drawing Sheets

METHODS AND APPARATUS FOR COMMUNICATING INTERNET PROTOCOL BASED CONTROL SIGNALING THROUGH A COMMUNICATIONS SYSTEM

GOVERNMENT LICENSE RIGHTS

The U.S. Government may have certain rights to some or all of the inventive subject matter of the present application as provided for by the terms of contract No. CP02H8901N awarded by the Department of Defense.

TECHNICAL FIELD

The inventive subject matter generally relates to methods and apparatus for communicating Internet Protocol (IP) based control signaling through a communications system, and more particularly to methods and apparatus for communicating IP-based call control signaling in a wireless communications system that utilizes Wideband Code Division Multiple Access (W-CDMA) as a transmission protocol between user equipment (UE) and a radio network.

BACKGROUND

Early telephony systems had very modest needs for signaling. The two primary types of information carried by the systems, control signaling and user traffic, shared the same path or "channel," and only one type of information was allowed on the channel at any one time. As technology advanced and the sophistication of services increased, telecommunications networks moved to separate control signaling and user traffic onto distinct signaling channels and bearer channels, respectively. This "out-of-band" signaling technique allowed the signaling channel to be optimized for signaling, and the bearer channel to be optimized per its requirements. In addition, the separation led to increased efficiencies. For example, a "thin" signaling channel could be maintained, while higher bandwidth bearer channels could be allocated on demand. In addition, control signaling could better be protected from end user manipulation, and more efficient management of the network, including error recovery, was made possible.

Current telecommunications networks are moving toward all-IP (Internet Protocol) implementations in which a SIP (Session Initiation Protocol), end-to-end, call control protocol is used to communicate call control information (e.g., information regarding establishing and releasing communications sessions, among other things). According to these implementations, SIP traffic and user traffic (e.g., voice, video and other traffic) use different IP ports. However, the SIP and user traffic streams often share the same physical path. In high bandwidth terrestrial networks, it is common to over-provision the bandwidth so that the two traffic streams will both meet their respective Quality of Service (QoS). However, such over-provisioning is not desirable in bandwidth-constrained wireless networks, particularly those that carry voice traffic. For example, interruptions in the flow of voice packets in order to send SIP messages may unacceptably degrade the user-perceived communications quality. In addition, causing higher priority SIP signaling to wait an indeterminate amount of time for a break in the voice traffic would be a non-robust solution.

Some current systems attempt to solve the problems discussed above by allowing user equipment (UEs) to create separate bearer streams for user traffic and call control signaling traffic. The call control signaling traffic is considered by the network as a "special" category of data for which a higher QoS is maintained by supporting delivery guarantee (e.g., retransmissions), implementing special routing and protections, and assigning a higher priority for the call control signaling traffic, for example. The UEs take advantage of the differences in the QoS maintained for the two types of streams. Although this method may be effective, it is highly dependent on the appropriate provisioning of UEs and the network to identify and maintain the QoS associated with the call control signaling traffic. Accordingly, cooperative agreements are necessitated regarding the characteristics and support of the call control signaling and bearer paths.

Trends in the commercial telecommunications industry indicate a movement towards more centralized management approaches to IP-based communications. Such trends are in conflict with allowing differential management between the call control signaling and user traffic paths at the UEs, as is implemented in current systems. Accordingly, what are needed are methods and apparatus for separating IP-based, call control signaling traffic from user traffic in wireless networks in a manner that is consistent with industry trends towards centralized management of the IP-based communications. Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the following detailed description.

Embodiments include methods and apparatus for communicating Internet Protocol (IP) based control signaling through a communications system, and more particularly to methods and apparatus for communicating IP-based call control signaling in a wireless communications system that utilizes Wideband Code Division Multiple Access (W-CDMA) as a transmission protocol between user equipment (UE) and a base of a radio network. Although the below-described embodiments will be described primarily in terms of a Universal Mobile Telecommunications System (UMTS) cellular telephone system that utilizes a W-CDMA transmission protocol, it is to be understood that alternate embodiments may be implemented in other types of wireless systems (e.g., CDMA2000, Global System for Mobile (GSM) networks that implement General Packet Radio Service (GPRS) or Enhanced Data rates for GSM Evolution (EDGE, also known as Enhanced GPRS), among others), and/or in systems that may use other types of transmission protocols (e.g., Time Division CDMA (TD-CDMA) or Time Division Synchronous CDMA (TD-SCDMA), among others). In addition, embodiments of the inventive subject matter also may be incorporated into non-wireless communications systems, as well. Accordingly, the detailed description of various embodiments, below, is not intended to limit applicability of the inventive subject matter only to the below-described embodiments.

Figure 1:
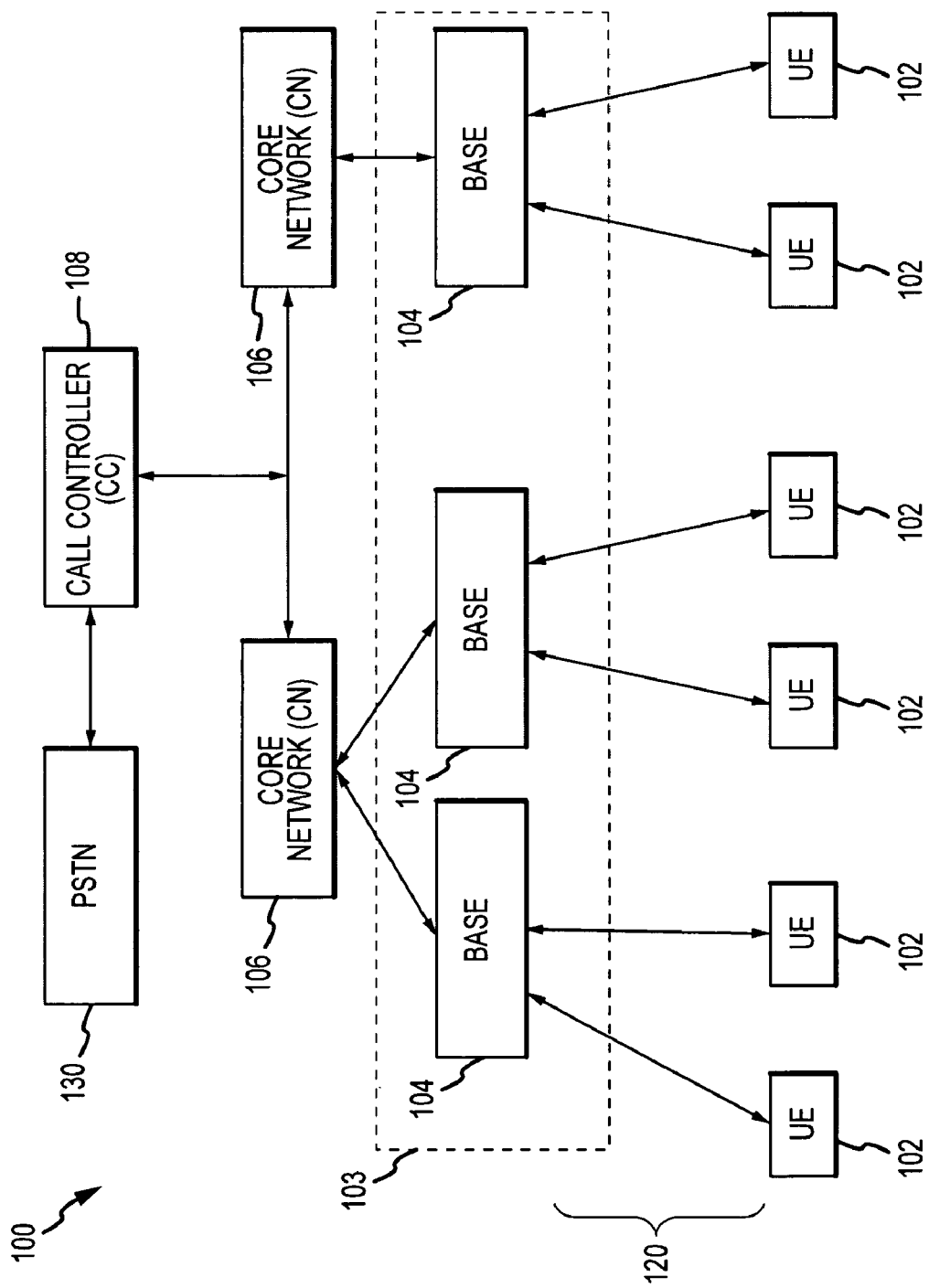
FIG. 1 is a simplified block diagram of a wireless communications system, in accordance with an example embodiment.

FIG. 1 is a simplified block diagram of a wireless communications system 100, in accordance with an example embodiment. System 100 may be, for example, a UMTS cellular telephone system that utilizes third-generation (3G) or fourth-generation (4G) cell phone technologies, in various embodiments. In an embodiment, system 100 comprises an IP network. System 100 includes a plurality of wireless communication devices 102 (referred to below as user equipment or "UE"), a radio network 103 (RN) that includes at least one base 104 (which alternatively may be referred to as a Node B), at least one core network 106 (CN), and at least one call controller 108 (CC). Although system 100 is illustrated to include six UE 102, three bases 104, two core networks 106, and one call controller 108, for simplicity, it is to be understood that an actual system may include different numbers of each of these system elements.

UE 102 may include any one or more devices adapted to transmit, over air interface 120, radio signals that are intermediately or finally destined for a base 104, and to receive over the air interface 120, radio signals originating from or routed by a base 104 toward UE 102. In an embodiment, air interface 120 utilizes a W-CDMA transmission protocol. UE 102 may be mobile, portable or stationary devices, which may include, but are not limited to, devices selected from a group of devices comprising a cellular telephone, a radio, a pager, a personal data assistant, a computer (e.g., a laptop or desktop computer), a network transceiver, an unmanned autonomous vehicle, and/or a wireless transceiver.

Base 104 includes a mobile, portable or stationary system element adapted to provide an interface between UE 102 and core network 106. In an embodiment, base 104 is adapted to communicate with UE using a W-CDMA transmission protocol. Information communicated between base 104 and UE 102 includes various types of control information and user traffic. The control information includes call control signaling information, among other things. As will be described in more detail later, UE 102 and base 104 are adapted to exchange call control signaling information using methods that may have certain advantages over traditional methods, according to various embodiments.

"Call control signaling information," as used herein, broadly means end-to-end control information relating to creating, modifying, and/or terminating two-party or multi-party communication sessions between a UE 102 and one or more other networked devices (e.g., other UEs 106, servers, and/or devices connected to a terrestrial network, such as Public Switched Telephone Network 130 (PSTN)). More specifically, call control signaling information may include information associated with establishing a communication session (e.g., a voice, data, and/or multimedia communication session) between a UE and one or more other networked devices (e.g., session announcement and session invitation control information), maintaining the communication session, modifying the communication session (e.g., control information relating to changing addresses or ports, inviting more participants, or adding or deleting media streams, among other things), and terminating the communication session. This information may be formatted, in an embodiment, using a Session Description Protocol (SDP) format, such as the SDP published by the Internet Engineering Task Force (IETF) and modifications thereof.

In a particular embodiment, call control signaling information is formatted and communicated according to the Session Initiation Protocol (SIP), a signaling and communication session setup protocol for IP-based communications, which has been accepted as a 3GPP signaling protocol and an element of the IP Multimedia Subsystem (IMS) architecture for IP-based streaming multimedia services in cellular systems. Various embodiments are adapted to utilize SIP to provide one or more services selected from a group of services that includes, but is not limited to, voice-over-IP (VoIP), voice and video conferencing, video and multimedia streaming, call forwarding, voice operated switchboard services, unified messaging (e.g., a service enabling a single user to be contacted on a plurality of different devices), instant messaging, location-based services (e.g., services that are triggered depending on the location of a UE), online games, presence information, and voice identification, among others. In alternate embodiments, other protocols adapted to support communication session establishment, maintenance, modification, and termination may be used instead of SIP, including but not limited to an H.323 protocol recommended by the International Telecommunication Union (ITU) Telecommunication Standardization Sector, among others.

As mentioned above, base 104 is adapted to provide an interface between UE 102 and core network 106 (e.g., to function as a "bent pipe" for radio signals communicated between UE 102 and core network 106). In an embodiment, base 104 may include at least one terrestrial-based or satellite-borne transmitter-receiver, transceiver, transponder, or repeater. In a more particular embodiment, base 104 includes a transponder borne by a geostationary satellite, and accordingly, base 104 forms a portion of a satellite-based radio network. The transponder is adapted to receive radio signals from UE 102, to filter, amplify, and otherwise process the signals in the analog and/or digital domain, and to produce radio signal, which base 104 transmits to core network 106. In the particular embodiment just described, base 104 is further adapted to receive a radio signal from core network 106, to filter, parse, route, amplify, and otherwise process the signal in the analog and/or digital domain, thus producing radio signals that base 104 transmits to UE 102. In other embodiments, base 104 may be mobile and/or borne by a satellite other than a geostationary satellite, such as a satellite following a low-Earth orbit, a medium-Earth orbit, a Molniya orbit, or a non-geostationary, geosynchronous orbit, for example.

Core network 106 is communicatively coupled with one or more bases 104 over RF links and/or links established through conductive transmission media. As used herein, the term "communicatively coupled" means that information signals are transmissible through various interconnections and transmission media between core network 106 and bases 104. The coupling may be direct, or may include one or more intermediate electrical components and/or system elements. Core network 106 may be adapted to provide functions such as a Mobile Switching Centre (MSC), Visitor Location Register (VLR), Home Location Register (HLR), Serving GPRS Support Node (SGSN), and Gateway GPRS Support Node (GGSN).

Call controller 108 is communicatively coupled with one or more core networks 106 over RF links and/or links established through conductive transmission media. In addition, call controller 108 may be communicatively coupled with one or more external networks, such as PSTN 130, for example. In an embodiment, call controller 108 is adapted to provide an interface between CNs 106 and/or other external networks, and to control the use and the reliability of radio resources within the radio network. Call controller 108 also may be adapted to communicate with one or more additional call controllers (not illustrated), which perform similar functions in different networks.

Figure 2:
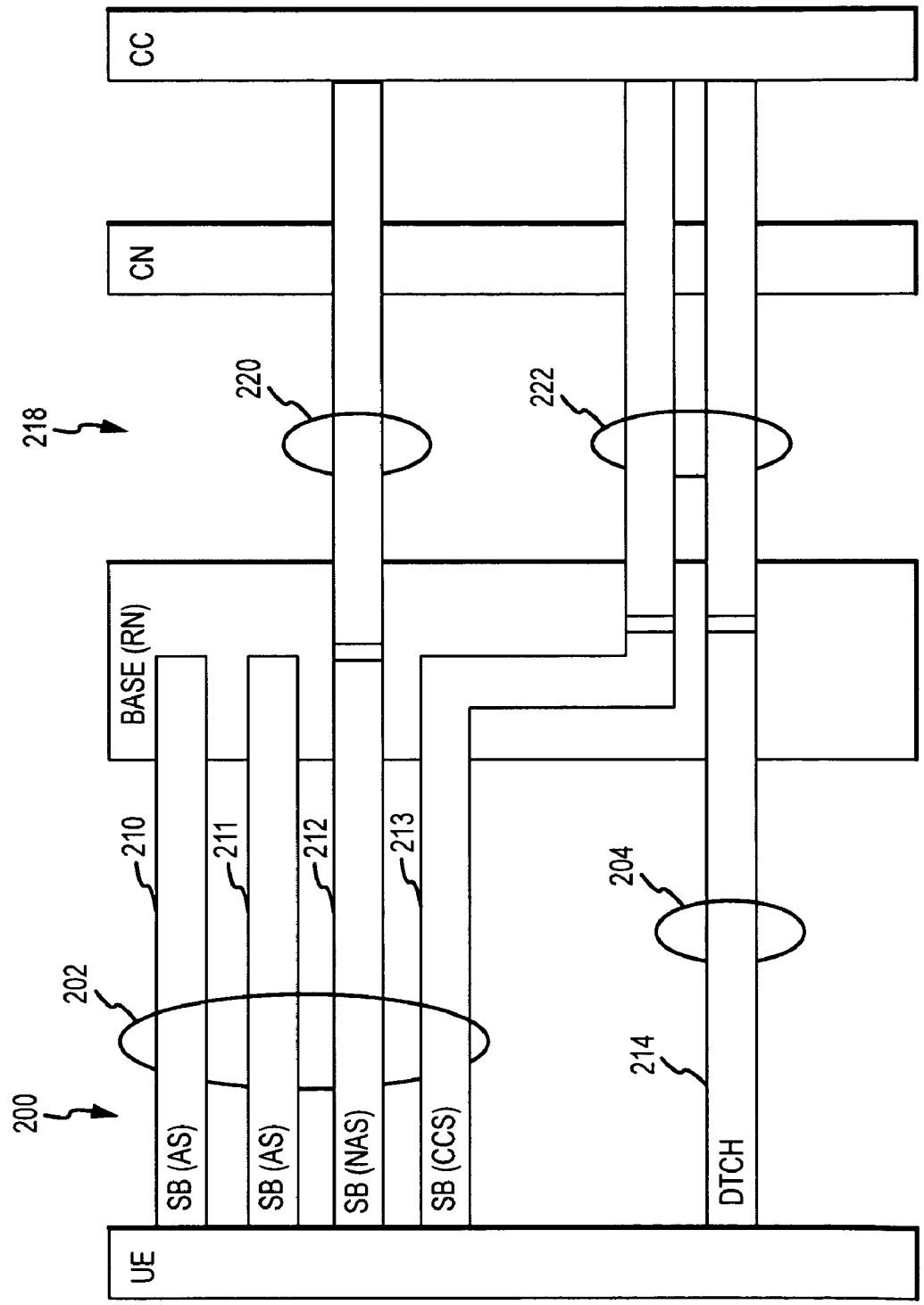
FIG. 2 is a diagram illustrating a model for communicating call control signaling information and user traffic in a communications system, in accordance with an example embodiment.

FIG. 2 is a diagram illustrating a model for communicating call control signaling information and user traffic in a communications system (e.g., system 100, FIG. 1), according to an example embodiment. From left to right, the system elements are identified as a UE, a base (which forms a portion of the radio network (RN)), a core network (CN), and a call controller (CC). These system elements represent their corresponding system elements in the system 100 depicted in FIG. 1.

A UE (e.g. UE 102, FIG. 1) and a base (e.g., base 104, FIG. 1) communicate over Uu interface 200, according to an embodiment. Uu interface 200 includes at least one physical channel between a UE and a base, to which at least two transport channels 202, 204 are mapped. As will be explained in more detail below, one or more logical channels may be mapped to each of the transport channels 202, 204. In a particular embodiment, the transport channels include a first Dedicated Channel (DCH) 202 to transfer signaling and control data, and a second DCH 204 to transfer user data. One or more logical channels, referred to herein as Dedicated Traffic Channels (DTCH) 214 may be supported by the DCH 204. DTCH 214 is adapted to carry user data, which may include, for example, voice and/or data. Logical channels (e.g., DTCH 214 and a Dedicated Control Channel (DCCH)) are in turn mapped to Bearers. In an embodiment, one or more (e.g., two) logical channels may be mapped to a single Bearer. In an embodiment in which Uu interface 200 is a radio interface, these Bearers may be Radio Bearers (RB).

A plurality of Signaling Bearers (SB) 210, 211, 212, 213, each mapped to its own DCCH, share DCH 202, and accordingly share a transport channel, in an embodiment. In an embodiment in which Uu interface 200 is a radio interface, SB 210-213 may be Signaling Radio Bearers (SRB). The signaling traffic carried over the plurality of SB 210-213, each mapped to its associated logical channel, is multiplexed onto a single transport channel (e.g., DCH 202). In the example illustrated in FIG. 2, four SB 210-213 share DCH 202, although more or fewer SB may share a DCH, in other embodiments, or a plurality of SB may be supported over multiple transport channels. In another embodiment, a Radio Bearer may be split over multiple logical channels so that, for example, retransmission requests may be mapped to a different transport channel from a transport channel used to carry data.

An SB 210-213 may be differentiated from DTCH 214 in that the system provides the SB 210-213 with higher QoS, higher priorities, higher delivery guarantee probabilities (e.g., via retransmissions), and better protection from user access than is provided for DTCH 214. Regarding priorities, a priority scheme is implemented for the signaling and user traffic communicated over the DCH 202 and the DCH 204, respectively. At a highest level, the signaling traffic communicated over the DCH 202 is given a higher priority than the user traffic communicated over the DCH 204. In addition, different types of signaling traffic communicated over each of the SBs 210-213 may have different priorities. For example, signaling traffic associated with maintaining the UE's connection with the network may be given a highest priority, where signaling traffic associated with maintaining connectivity for a particular call may be given a lower priority. Regarding protection, for example, the system (e.g., the UE) prohibits a user from accessing call control signaling information communicated over an SB (e.g., SB 213), whereas a user may have access to data communicated over a DTCH 214.

According to an embodiment, one or more SB (e.g., SB 210, 211) is allocated for communicating signaling traffic by the Access Stratum (AS) (e.g., the radio network), and one or more other SB (e.g., SB 212) is allocated for communicating signaling traffic by the Non-Access Stratum (NAS). Finally, one or more other SB (e.g., SB 213) is allocated for communicating call control signaling information. The SB allocated for communicating the call control signaling information may be an SB defined in an existing specification for another purpose (e.g., Short Message Service (SMS) messages), or one or more new SB may be defined for the purpose of communicating the call control signaling traffic.

The NAS is a functional layer running between the UE (e.g., UE 102, FIG. 1) and a core network (e.g., core network 106, FIG. 1). The function of the AS is to control the air interface resources, as well as to support the transport of the NAS by providing services to the NAS. For example, one service that the AS provides to the NAS is a Radio Access Bearer (RAB) service, which includes the service of transferring user traffic between a UE and the core network. According to an embodiment, and as will be described in more detail below, this service also includes communicating call control signaling traffic over a RAB between the base and the core network.

AS signaling traffic represents a first level of control information between a UE and a base, and may include, for example, setup, reconfiguration and release of Radio Bearers, transport channels and physical channels, handovers, and/or measurement control. The SB (e.g., SB 210, 211) allocated for communicating AS signaling traffic terminates in the base (e.g., base 104, FIG. 1) or the radio network, where the AS signaling traffic is utilized by a network controller (e.g., a Radio Network Controller (RNC) in the base). NAS signaling traffic represents a second level of control information between a UE and a base, and may include, for example, attach, authentication, activation, modification and/or deletion of Packet Data Protocol (PDP) contexts. The NAS signaling traffic that a base receives from a UE over an SB (e.g., SB 212) is communicated over an Iu interface 218 between the base and the core network, where the NAS signaling traffic is utilized. More specifically, the NAS signaling traffic may be communicated between the base and the core network over an Iu Control Plane 220 of the Iu interface 218 via a medium for transferring messages between signaling points within the system (e.g., a Signaling Connection Control Part (SCCP) 220). The Iu Control Plane 220 may generally be considered the portion of the Iu interface 218 allocated for transfer of signaling information. The core network may, in turn, communicate the NAS signaling traffic to a call controller (CC) (e.g., call controller 108, FIG. 1), where the NAS signaling traffic may be further utilized.

Finally, call control signaling traffic represents a third level of control information between a UE and a base, and further between a UE and other system elements downstream of the base. As with the NAS signaling traffic, the base communicates the call control signaling traffic received over an SB (e.g., SB 213) to the core network (e.g., CN 106, FIG. 1) over the Iu interface 218. However, the call control signaling traffic is communicated between the base and the core network over an Iu User Plane 222 of the Iu interface 218, rather than over the Iu Control Plane 220. The Iu User Plane 222 may generally be considered the portion of the Iu interface 218 allocated for transfer of user data and/or speech, although the Iu User Plane 222 is allocated also to transfer call control signaling traffic, according to an embodiment. The core network may, in turn, communicate the call control signaling traffic to the call controller (e.g., call controller 108, FIG. 1), where the call control signaling traffic may be further utilized. As indicated above, the Iu User Plane 222 also may be used to carry the user traffic received by the base on DTCH 214. Accordingly, the call control signaling traffic and the user traffic may be multiplexed onto the Iu User Plane 222.

DCH 202, DCH 204, SBs 210-213, DTCH 214, and other logical, transport or physical channels discussed herein, may be defined according to a UMTS standard, in an embodiment. In other embodiments, logical, transport, and/or physical channels that are analogous to DCH 202, DCH 204, SBs 210-213, and DTCH 214 may be defined according to other standards (e.g., CDMA2000, GPRS, or EDGE, among others), and embodiments that include logical, transport, and/or physical channels defined according to such other standards are intended to be included within the scope of the inventive subject matter. Accordingly, although the names of these various logical, transport, and/or physical channels may be similar or identical to names specified in a UMTS standard, the use of those names is not meant to limit the scope of the inventive subject matter only to implementations according to a UMTS standard.

Figure 3:
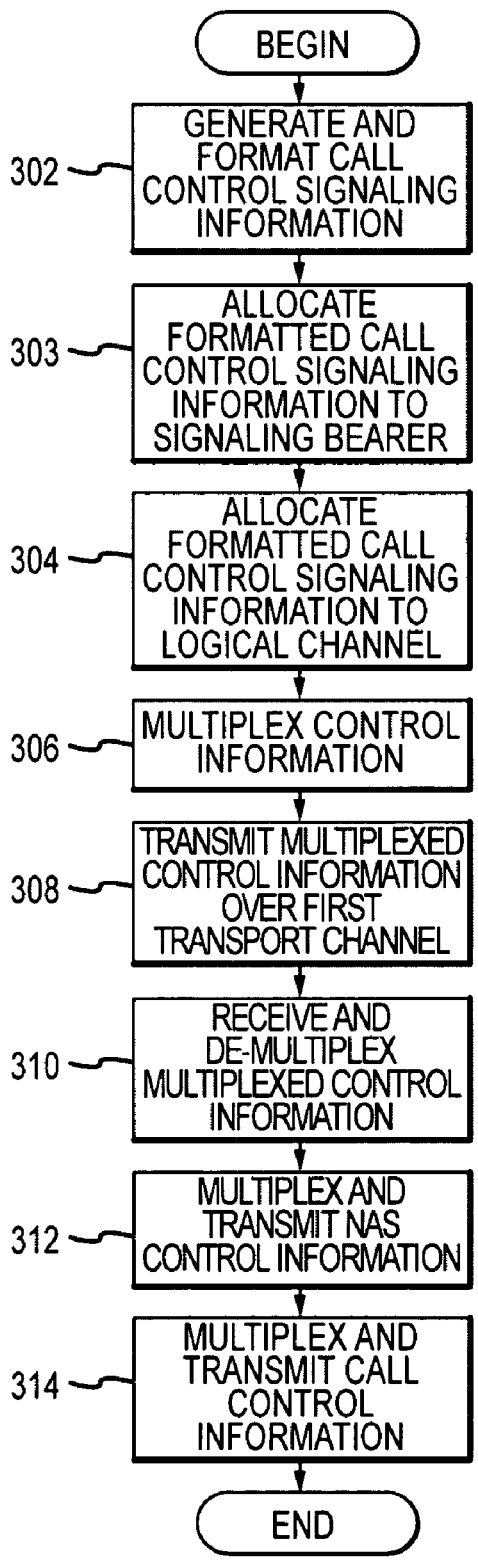
FIG. 3 is a flowchart of a method for a User Equipment (UE) and a base to exchange and process call control signaling information originating from the UE, in accordance with an example embodiment.

FIG. 3 is a flowchart of a method for a UE (e.g., UE 102, FIG. 1) and a base (e.g., base 104, FIG. 1) to exchange and process call control signaling information originating from the UE, in accordance with an example embodiment. The method may begin after a UE has initiated and completed a process of establishing itself with the network. This may include, for example, performing an initial cell selection process, reading system information blocks (SIBs), attach, activating a call controller path, and registering with a call controller. At this point, the UE is established with the network, and is ready to initiate a communication session with another system element (e.g., another UE) or to respond to a request by another system element to participate in a communication session. Either way, the UE may transmit call control signaling information to the other system element during the process of establishing, maintaining, modifying, and releasing the communication session.

In order to transmit call control signaling information, the UE may generate and format the call control signaling information, in block 302. In an embodiment, the call control signaling information is formatted into a message according to SIP, although it may be formatted according to other protocols, in other embodiments. The UE may then allocate the SIP-formatted, call control signaling information to a signaling bearer (e.g., SB 213, FIG. 2), in block 303. The UE may then allocate the SIP-formatted, call control signaling to a first logical channel, in block 304. The UE may then multiplex the SIP-formatted, call control signaling information allocated to the first logical channel with control information allocated to other logical channels (e.g., SB 210-212, FIG. 2), in block 306. This other control information may include, for example, AS control information and/or NAS control information, among other things. The UE may then transmit the multiplexed control information over a first transport channel of the Uu interface (e.g., Uu interface 200, FIG. 2), in block 308. In an embodiment, this includes transmitting the multiplexed control information over a DCH (e.g., DCH 202, FIG. 2). The UE also may transmit user traffic over a second transport channel of the Uu interface (e.g., over a DCH 204, FIG. 2). As discussed previously, the UE may apply greater protections to the call control information than to the user traffic so that the call control information is not accessible to the user. In addition, the UE may provide an increased likelihood of delivery by employing retransmissions of the call control information, according to an embodiment.

The base may receive and de-multiplex the multiplexed control information from the UE over the transport channel, in block 310, to produce de-multiplexed AS control information, NAS control information, and/or call control information from the UE. In an embodiment, an RNC associated with the base may receive and process the de-multiplexed AS control information. In block 312, the base may multiplex the NAS control information, if any, with NAS control information received from one or more other UE, if any, and may transmit the multiplexed NAS control information over the Iu interface (e.g., Iu interface 218, FIG. 2) to the core network (e.g., core network 106, FIG. 1) in the Iu Control Plane.

In block 314, the base may receive additional call control information from one or more other UE, multiplex the call control information from the multiple UE together, and transmit the multiplexed call control information over the Iu interface to the core network in the Iu User Plane, according to an embodiment. In addition, the base may multiplex user traffic from multiple UE, and may transmit the multiplexed user traffic to the core network in the Iu User plane. The core network and the call controller (e.g., call controller 108, FIG. 1) may then route the call control information and the user traffic to the appropriate destination device(s) (e.g., another UE or other system element). In order to be concise, the processes performed by the core network and the call controller with regard to the call control information, NAS control information, and user traffic are not discussed in detail in conjunction with FIG. 3. The method may then end.

Figure 4:
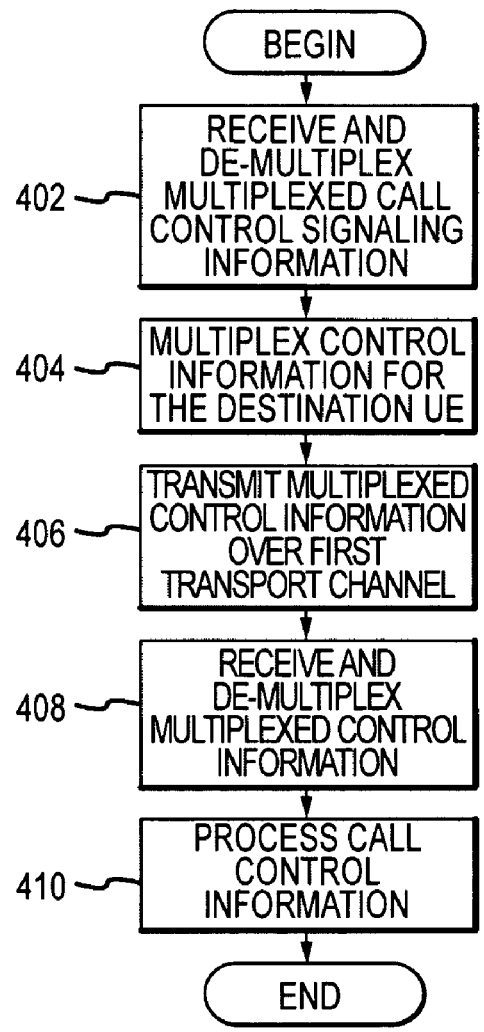
FIG. 4 is a flowchart of a method for a UE and a base to exchange and process call control signaling information destined for a UE, in accordance with an example embodiment.

FIG. 4 is a flowchart of a method for a UE and a base to exchange and process call control signaling information destined for the UE, in accordance with an example embodiment. As with the method of FIG. 3, the method of FIG. 4 may begin after a UE has initiated and completed a process of establishing itself with the network. The method may begin, in block 402, when the base receives multiplexed call control information over the Iu interface from the core network in the Iu User Plane, according to an embodiment. In addition, the base may receive multiplexed user traffic from the core network in the Iu User plane. The base may de-multiplex the multiplexed call control information in order to produce call control information destined for a first destination UE and, possibly, one or more other destination UE.

For the first destination UE, the base may, in block 404, multiplex NAS control information and/or AS control information, if any, for the first destination UE with the call control information that is destined for the first destination UE. The base may then transmit the multiplexed AS, NAS, and call control information over a first transport channel of the Uu interface (e.g., Uu interface 200, FIG. 2), in block 406. In an embodiment, this includes transmitting the multiplexed control information over a DCH (e.g., DCH 202, FIG. 2). The base also may transmit user traffic destined for the first destination UE over a second transport channel of the Uu interface (e.g., over a DCH 204, FIG. 2).

The UE may receive and de-multiplex the multiplexed control information received from the base over the first transport channel, in block 408, to produce de-multiplexed AS control information, NAS control information, and/or call control information from the base. In addition, the UE may receive the user traffic from the base over the second transport channel. The UE may then process the call control information, in block 408, and the method may end.

Figure 5:
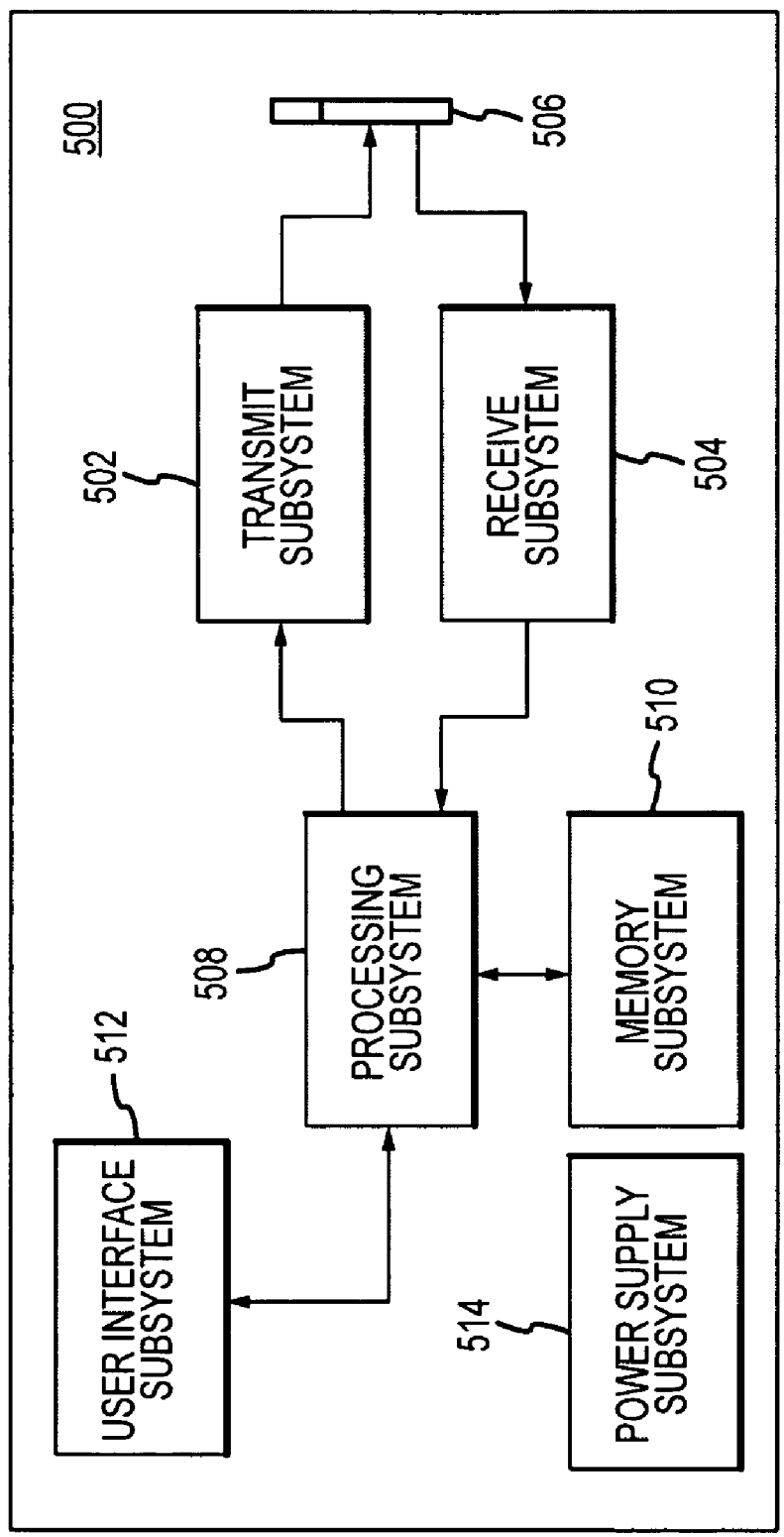
FIG. 5 is a simplified block diagram of a UE, in accordance with an example embodiment.

FIG. 5 is a simplified block diagram of a UE 500, in accordance with an example embodiment. UE 500 is adapted to transmit electromagnetic signals over an air interface. UE 500 includes at least one transmit subsystem 502, receive subsystem 504, antenna 506, processing subsystem 508, memory subsystem 510, user interface subsystem 512, and power supply subsystem 514, in an embodiment. These subsystems are communicatively coupled together as illustrated in FIG. 5. Although certain interconnections are illustrated in FIG. 5, it is to be understood that more, fewer or different interconnections may be present in other embodiments.

The at least one processing subsystem 508 is adapted to perform various functions. In an embodiment, this includes generating call control signaling information, allocating the call control signaling information to an SB (e.g., SB 213, FIG. 2), multiplexing the call control signaling information with other signaling information (e.g., AS and/or NAS signaling information) allocated to other SB (e.g., SB 210-212, FIG. 2), and transmitting the multiplexed signaling information over a first transport channel (e.g., DCH 202, FIG. 2). In addition, functions performed by processing subsystem 508 may include receiving and de-multiplexing multiplexed signaling information from the first transport channel to produce call control signaling information, among other things, which is further processed by the at least one processing subsystem 508. Additional functions performed by the at least one processing subsystem 508 may include, for example, generating outgoing digital signals, processing incoming digital signals, interfacing with the at least one memory subsystem 510 to store and retrieve data, interfacing with the at least one user interface subsystem 512, and performing various power control functions in conjunction with the at least one power supply system 514. The at least one power supply system 514 may include, for example, an interface to AC line power and/or a battery power subsystem.

User interface subsystem 512 may include one or more user interface components adapted to enable a user to input commands or other information into UE 500 and/or to provide visual, auditory, or mechanical indicia intended to convey information to the user. For example, but not by way of limitation, user interface subsystem 510 may include one or more display screens, touch screens, lights, speakers, vibration devices, keypads, buttons, dials, and/or other components adapted to receive input commands and/or to produce information-conveying indicia.

Memory subsystem 510 may include one or more components adapted to store digital information in a retrievable format. For example, but not by way of limitation, memory subsystem 510 may include one or more removable or non-removable, volatile or non-volatile memory components, such as ROM-based memory components, RAM-based memory components, CDs, DVDs, and/or magnetic storage media (e.g., hard disks or floppy disks), to name a few.

Transmit subsystem 502 is adapted to receive outgoing digital signals generated by processing subsystem 508, and to perform digital-to-analog conversion, up-conversion, and amplification, among other things, to the outgoing digital signals in order to generate outgoing RF signals. The outgoing RF signals are transmitted over the air interface by antenna 506. Receive subsystem 504 is adapted to receive incoming RF signals from antenna 506, and to perform down-conversion, filtering, and analog-to-digital conversion, among other things, to the incoming RF signals in order to generate incoming digital signals. The incoming digital signals may be processed by processing subsystem 508.

Figure 6:
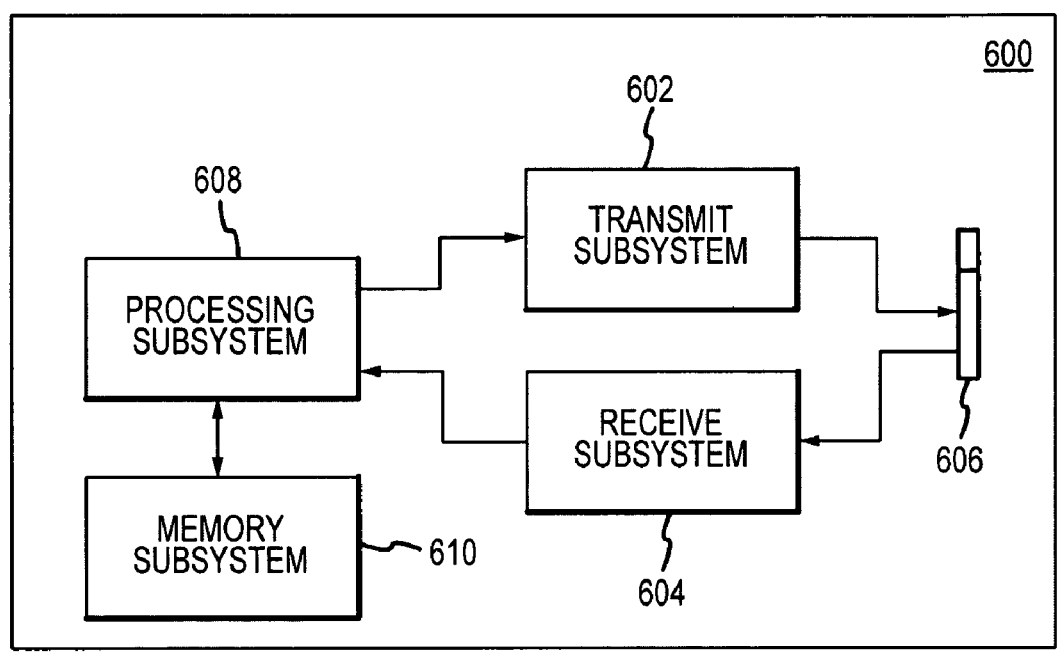
FIG. 6 is a simplified block diagram of a base, in accordance with an example embodiment.

FIG. 6 is a simplified block diagram of a base 600, in accordance with an example embodiment. Base 600 is adapted to transmit electromagnetic signals over an air interface, in order to communicate with a plurality of UE (e.g., UE 102, FIG. 1 or UE 400, FIG. 4). Base 600 includes at least one transmit subsystem 602, receive subsystem 604, antenna 606, processing subsystem 608, and memory subsystem 610, in an embodiment. These subsystems are communicatively coupled together as illustrated in FIG. 6. Although certain interconnections are illustrated in FIG. 6, it is to be understood that more, fewer or different interconnections may be present in other embodiments.

The at least one processing subsystem 608 is adapted to perform various functions. In an embodiment, this includes receiving and de-multiplexing multiplexed control information from a UE over a first transport channel (e.g., DCH 202, FIG. 2) of the Uu interface to produce de-multiplexed call control signaling information from the UE, multiplexing the call control signaling information with call control signaling information received from other UE, if any, and transmitting the multiplexed call control information over the Iu interface to the core network in the Iu User Plane. In addition, functions performed by processing subsystem 608 may include receiving multiplexed call control information from the core network over the Iu interface in the Iu User Plane, de-multiplexing the multiplexed call control information in order to produce call control information destined for a first destination UE and, possibly, one or more other destination UE, multiplexing NAS control information and/or AS control information, if any, for the first destination UE with the call control information that is destined for the first destination UE, and transmitting the multiplexed AS, NAS, and call control information to the UE over the first transport channel of the Uu interface. Additional functions performed by the at least one processing subsystem 608 may include, for example, generating outgoing digital signals, processing incoming digital signals, interfacing with the at least one memory subsystem 610 to store and retrieve data, and/or interfacing with other wired and/or wireless networks.

Memory subsystem 610 may include one or more components adapted to store digital information in a retrievable format. For example, but not by way of limitation, memory subsystem 610 may include one or more removable or non-removable, volatile or non-volatile memory components, such as ROM-based memory components, RAM-based memory components, CDs, DVDs, and/or magnetic storage media (e.g., hard disks or floppy disks), to name a few.

Transmit subsystem 602 is adapted to receive outgoing digital signals generated by processing subsystem 608, and to perform digital-to-analog conversion, up-conversion, and amplification, among other things, to the outgoing digital signals in order to generate outgoing RF signals. The outgoing RF signals are transmitted over the air interface by antenna 606. Receive subsystem 604 is adapted to receive incoming RF signals from antenna 606, and to perform down-conversion, filtering, and analog-to-digital conversion, among other things, to the incoming RF signals in order to generate incoming digital signals. The incoming digital signals may be processed by processing subsystem 608.

Embodiments of methods and apparatus for communicating IP-based control signaling through a communications system have now been described. The various embodiments may have one or more advantages over traditional methods and apparatus. For example, implementations of an embodiment into a UE may enable call control signaling information to be better protected from unauthorized user access, which access is easier to obtain in a system in which call control signaling information is transmitted over a bearer channel. In addition, by implementing an embodiment in a UE, the UE may perform various actions, such as retransmissions, that increase the likelihood for call control signaling information to be received at its intended destination. Accordingly, by implementing an embodiment, the likelihood is decreased that a communication session will terminate unexpectedly in an area of relatively weak service. In addition, according to an embodiment, no bearer traffic channels need to be allocated to transmitting the call control signaling information, thus making more bandwidth available for user traffic. Other advantages may be realized from the system perspective. For example, using a traditional technique of transmitting call control signaling information over a bearer traffic channel, the system is unable to ascertain certain aspects of the nature of the communication session (e.g., what type of information is being exchanged during the session). By transmitting the call control signaling information in accordance with an embodiment, the system has an enhanced opportunity to evaluate the call control signaling information in order to better ascertain the nature of the communication session. Therefore, the system may apply different billing rates for different types of information carried by the system.

The foregoing detailed description is merely exemplary in nature and is not intended to limit the inventive subject matter or the application and uses of the inventive subject matter to the described embodiments. Furthermore, there is no intention to be bound by any theory presented in the preceding background or detailed description. Those of skill in the art will recognize, based on the description herein, that various other apparatus and processes may be included in embodiments of the systems and methods described herein for conditioning, filtering, amplifying, and/or otherwise processing various signals. In addition, the sequence of the text in any of the claims does not imply that process steps must be performed in a temporal or logical order according to such sequence unless it is specifically defined by the language of the claim. The process steps may be interchanged in any order, and/or may be performed in parallel, without departing from the scope of the inventive subject matter. In addition, it is to be understood that information within the various different messages, which are described above as being exchanged between the system elements, may be combined together into single messages, and/or the information within a particular message may be separated into multiple messages. Further, messages may be sent by system elements in sequences that are different from the sequences described above. Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled technicians may implement the described functionality in varying ways for each particular application, but such implementation decisions should not be interpreted as causing a departure from the scope of the inventive subject matter.

The steps of a method or algorithm described in connection with the embodiments disclosed herein may be embodied directly in hardware, in one or more software modules executed by a processor, or in a combination of the two. A software module may reside in random access memory, flash memory, read only memory (ROM), erasable programmable ROM (EPROM), electrical EPROM, registers, hard disk, a removable disk, a compact disc ROM (CD-ROM), or any other form of storage medium known in the art. An exemplary storage medium is coupled to a processor such that the processor can read information from, and write information to, the storage medium. In the alternative, the storage medium may be integral to a processor.

An embodiment includes a method for communicating call control signaling information in a communications system that includes a UE and a base. The method is performed by the UE and includes the steps of formatting the call control signaling information, transmitting the call control signaling information over a first logical channel that is mapped to a first transport channel, and transmitting user traffic over a second logical channel that is mapped to a second transport channel.

Another embodiment includes a method for communicating call control signaling information, which is performed by a base. The method includes receiving the call control signaling information from the UE over a first logical channel that is mapped to a first transport channel, receiving user traffic from the UE over a second logical channel that is mapped to a second transport channel, and transmitting the call control signaling information to a core network.

Another embodiment includes a communications system having a UE that is adapted to format call control signaling information, transmit the call control signaling information to a base over a first logical channel that is mapped to a first transport channel, and transmit user traffic over a second logical channel that is mapped to a second transport channel. According to a further embodiment, the communication system comprises an IP network in which information is exchanged between the UE and the base using a W-CDMA transmission protocol. A further embodiment of the communications system includes the base, and the base is adapted to receive the call control signaling information from the UE over the first logical channel, receive the user traffic from the UE over the second logical channel, and transmit the call control signaling information to a core network. According to a further embodiment, the base forms a portion of a satellite-based radio network.

While various exemplary embodiments have been presented in the foregoing detailed description, it should be appreciated that a vast number of variations exist. It should also be appreciated that the exemplary embodiments are only examples, and are not intended to limit the scope, applicability or configuration of the inventive subject matter in any way. Rather, the foregoing detailed description will provide those skilled in the art with a convenient road map for implementing various embodiments of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A method for communicating call control signaling information in a wireless communications system that includes a core network, a user equipment (UE) and a base in a radio network, the method comprising the steps of:
formatting the call control signaling information;
transmitting the call control signaling information from the UE to the base over a first logical channel that is mapped to a first transport channel;
transmitting user traffic from the UE to the base over a second logical channel that is mapped to a second transport channel; and
communicating from the base the call control signaling information and the user traffic received from the UE to the core network over an Iu interface of an Iu user plane rather than over an Iu control plane.

2. The method of claim 1, wherein formatting the call control signaling information comprises formatting the call control signaling information into a message according to a Session Initiation Protocol (SIP).

3. The method of claim 1, wherein formatting the call control signaling information comprises formatting the call control signaling information as a message according to a protocol within a group of protocols consisting of a Session Initiation Protocol (SIP) and H.323.

4. The method of claim 1, wherein transmitting the call control signaling information and transmitting the user traffic comprises transmitting the call control signaling information and transmitting the user traffic using a Wideband Code Division Multiple Access (W-CDMA) transmission protocol.

5. The method of claim 1, further comprising:
multiplexing additional control information allocated to one or more other logical channels with the call control signaling information prior to transmitting the call control signaling information.

6. The method of claim 5, wherein the additional control information includes information selected from a group consisting of access stratum control information and non-access stratum control information.

7. The method of claim 6, wherein at least a third logical channel is allocated to the access stratum control information, and at least a fourth logical channel is allocated to the non-access stratum control information.

8. The method of claim 1, further comprising:
receiving call control signaling information destined for the UE from the base over the first logical channel that is mapped to the first transport channel.

9. The method of claim 1, further comprising:
before communicating the call control signaling information or the user traffic to the core network:
multiplexing, at the base, the call control signaling information with other call control signaling information from other UEs to generate multiplexed call control signaling information for communication over the Iu interface to the core network in the Iu user plane; and
multiplexing, at the base, the user traffic with other user traffic from other UEs to generate multiplexed user traffic for communication over the Iu interface to the core network in the Iu user plane.

10. A method for communicating call control signaling information in a wireless communications system that includes a core network, a user equipment (UE) and a base in a radio network, the method performed by the base and comprising the steps of:
receiving the call control signaling information from the UE over a first logical channel that is mapped to a first transport channel;
receiving user traffic from the UE over a second logical channel that is mapped to a second transport channel; and
transmitting from the base the call control signaling information and the user traffic received from the UE to the core network over an Iu interface of an Iu user plane rather than over an Iu control plane.

11. The method of claim 10, wherein receiving the call control signaling information comprises:
receiving multiplexed control information from the UE over the first transport channel; and
de-multiplexing the multiplexed control information to produce the call control signaling information and additional control signaling information.

12. The method of claim 11, wherein the additional control information includes information selected from a group consisting of access stratum control information and non-access stratum control information.

13. The method of claim 10, further comprising:
receiving additional call control signaling information from one or more other UE; and
multiplexing the call control signaling information with the additional call control signaling information to produce multiplexed call control signaling information, wherein transmitting the call control signaling information comprises transmitting the multiplexed call control signaling information over the Iu interface of the Iu user plane.

14. The method of claim 10, further comprising:
receiving multiplexed call control signaling information from the core network;
de-multiplexing the multiplexed call control signaling information to produce call control signaling information destined for the UE; and
transmitting the call control signaling information destined for the UE to the UE.

15. The method of claim 10, further comprising:
before communicating the call control signaling information or the user traffic to the core network:
receiving additional user traffic from other UEs; and
multiplexing, at the base, the user traffic with additional user traffic from other UEs to produce multiplexed user traffic for communication to the core network over the Iu interface.

16. A wireless communications system comprising:
a core network;
a base in a radio network that is communicatively coupled to the core network over an Iu interface of an Iu user plane; and
a user equipment (UE) configured to format call control signaling information, transmit the call control signaling information to a base over a first logical channel that is mapped to a first transport channel, and transmit user traffic over a second logical channel that is mapped to a second transport channel, and wherein the base is configured to receive the call control signaling information from the UE over the first logical channel, receive the user traffic from the UE over the second logical channel, and transmit the call control signaling information and the user traffic received from the UE to the core network over the Iu interface of an Iu user plane rather than over an Iu control plane.

17. The communications system of claim 16, wherein information is exchanged between the UE and the base using a Wideband Code Division Multiple Access (W-CDMA) transmission protocol.

18. The communications system of claim 16, wherein the UE is a wireless communication device selected from a group of devices comprising a cellular telephone, a radio, a pager, a personal data assistant, a computer, a network transceiver, an unmanned autonomous vehicle, and a wireless transceiver.

19. The communications system of claim 16, wherein the base forms a portion of a satellite-based radio network.

20. The communications system of claim 16, wherein the base is configured to multiplex the call control signaling information, before communicating the call control signaling information to the core network, with other call control signaling information from other UEs to generate multiplexed call control signaling information for communication over the Iu interface to the core network in the Iu user plane; and wherein the base is configured to multiplex the user traffic, before communicating the user traffic to the core network, with other user traffic from other UEs to generate multiplexed user traffic for communication over the Iu interface to the core network.

21. A method for communicating call control signaling information in a wireless communications system that includes a core network, a user equipment (UE) and a base in a radio network, the method performed by the base and comprising the steps of:

receiving the call control signaling information communicated from the UE over a Uu interface of a control plane that includes a first logical channel that is mapped to a first transport channel, wherein the call control signaling information is formatted into a message according to a Session Initiation Protocol (SIP);

receiving user traffic from the UE over a second logical channel that is mapped to a second transport channel; and transmitting the call control signaling information and the user traffic received from the UE to the core network over an Iu interface of an Iu user plane rather than over an Iu control plane.

* * * * *